Patented Oct. 10, 1939

2,175,556

UNITED STATES PATENT OFFICE 2,175,556

PROCESS FOR MAKING 2-ETHYLCROTON-ALDEHYDE

Henry L. Cox, South Charleston, W. Va., assignor to Carbide & Carbon Chemicals Corporation, a corporation of New York No Drawing. Application December 18, 1936, Serial No. 116,554

3 Claims. (Cl. 260—601)

The invention relates to a process for making 2-ethylcrotonaldehyde for hydrogenation to 2-ethylbutyraldehyde, a branched chain hexaldehyde represented by the structural formula:

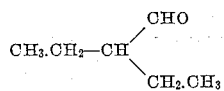

Related substances having the same carbon skeleton, but having more or less hydrogen atoms, are also formed in this reaction.

The 2-ethylbutyraldehyde in pure form is substantially water-white, having a specific gravity of 0.8170 at 20°/20° C., and a boiling point of 116° to 117° C. This aldehyde is particularly valuable as an intermediate in the preparation of ethylbutyric acid, certain esters of which are now in considerable demand as plasticizers in artificial resin composition. While 2-ethylbutyraldehyde is not a new chemical compound, its source heretofore has been primarily as a by-product in the preparation of other chemicals, and those processes which have been proposed for making it have not proved to be economical in commercial production. Related compounds which may be made by the process include in particular 2-ethylbutanol, which also has an established value in chemical synthesis.

It is an object of my invention to provide a new and improved process for producing 2-ethylbutyraldehyde and related substances through the intermediate of 2-ethylcrotonaldehyde, in which the yields and efficiency of the reaction are well adapted for economical large scale production.

In its broadest aspect the process comprises three separate steps, the first of which involves an aldol condensation reaction, in which an excess of acetaldehyde is condensed with a four-carbon straight-chain aldehyde, in the presence of a suitable catalyst, to form directly a six-carbon aldol having the desired carbon skeleton. This aldol is then cracked or dehydrated in the presence of a strong inorganic acid, and under conditions which will be hereinafter described in more detail, to the unsaturated six-carbon aldehyde. In the last reaction step this aldehyde is converted to the product desired by hydrogenation over a conventional hydrogenation catalyst.

Typical reactions involved in the process may be represented by the following equations:

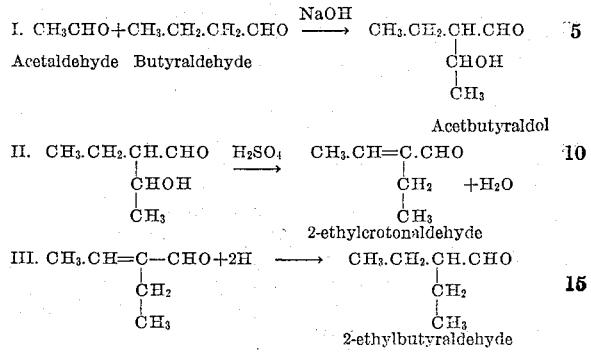

When butyraldehyde is used as the four-carbon aldehyde, the condensation is conducted with the acetaldehyde in considerable excess, and in molar proportions of acetaldehyde to butyraldehyde from about 2:1 to as high as 10:1 very satisfactory conversion to acetbutyraldol has been obtained. The greater excess of acetaldehyde within the above range appears to improve the overall yield and efficiency of the reaction, but due largely to the necessity of recovering much higher volumes of unreacted acetaldehyde when it is present in the high ratios, it is preferred in commercial production to maintain an original reaction ratio of about 4:1.

When substantial equilibrium in the condensation has been reached, the complete reaction mixture is subjected to dehydration by cracking in the presence of a strong acid such as sulfuric or phosphoric acid. In the preferred procedure the aldol containing mixture is added slowly to a kettle containing boiling 2% sulfuric acid. A reflux column is provided, and the rate of aldol addition to the boiling acid is controlled in such relation to the distillate removed so as to maintain substantially constant the acid concentration in the kettle. The complete distillate taken off at a still head temperature of 92° to 98° C. contains all of the 2-ethylcrotonaldehyde, as well as certain quantities of other unsaturated aldehydes the formation of which cannot be avoided. High-boiling oils including byproduct impurities and complex unsaturated compounds are also obtained in this distillate. By further rectification the 2-ethylcrotonaldehyde may be isolated in quite pure form and subjected to hydrogenation in this condition, or as another alternative the complete distillate may be hydrogenated and the 2-ethylbutyraldehyde then separated. By either method hydrogenation to the saturated aldehyde may be readily controlled, and the product sought, 2-ethylbutyraldehyde, can be easily isolated in good yields of substantially pure form. More or less 2-ethylbutanol is also formed depending on the completeness of the hydrogenation, and this is separated by distillation.

By way of example, the following experimental procedure is illustrative of the invention:

Example I

To a one-gallon container there was charged 2250 grams of mixed acetaldehyde and butyraldehyde, amounting to about 2800 cc. of liquid. The container was equipped with a coil for brine cooling and fitted with a stirring shaft and dropping funnel through a cover adapted to be sealed in place. The vessel was vented through a cold trap, and an inert atmosphere maintained therein. The charge was mixed while cooling to a temperature of 0° C., after which there was added from the dropping funnel a slow stream of 2% aqueous sodium hydroxide solution. A warming of the mixture to about 12° C. was permitted, which temperature was maintained during the course of the reaction. Continuous vigorous agitation was also effected through the stirring mechanism. By periodical testing, the alkalinity was kept to a caustic concentration of .03% to .04%, and equilibrium in the reaction under these conditions was reached in seven to eight hours. After neutralization, the aldol reaction mixture was then withdrawn and introduced to a second apparatus where cracking was effected by dropping into boiling 2% sulfuric acid. A reflux column and kettle were used and the aldol was introduced into the latter from a cylindrical dropping funnel having a needle valve flow control. The rate of aldol addition was by this means adjusted to substantially the same rate as the distillate removal, whereby the concentration of acid in the kettle was maintained close to constant. To insure complete removal of ethylcrotonaldehyde in the distillate, the column head temperature was kept above 92° C., and after all of the aldol mixture had been added, distillation was continued until a column head temperature of 97° C. to 98° C. was reached. About eight hours in all was required for cracking or dehydration of the aldol reaction product. This entire distillate was then subjected to rectification, by which the 2-ethylcrotonaldehyde was readily removed from other products of the reaction, and conversion to the saturated 2-ethylbutyraldehyde was effected by hydrogenation in the vapor phase over nickel or other suitable catalyst.

With reaction conditions substantially identical with the above example, numerous tests were made with various molar ratios of the original aldehyde reactants. In all instances an excess of acetaldehyde in a proportion to the butyraldehyde of 2:1 or higher is desirable, and with this ratio as high as ten very good results have been obtained. In fact, there is indication that overall yields and efficiency of the reaction improves with the higher acetaldehyde ratio. The alkalinity during condensation may also be varied, and by increasing the sodium hydroxide concentration to amounts such as .05% and 0.12%, the time required to reach equilibrium in this step of the reaction has been shortened. During cracking, the acid concentration in the kettle should be kept at a low figure, and preferably substantially constant. While 2% sulfuric acid gives especially good results, a slight increase may be desirable, but the concentration should invariably be maintained below 5%.

Aldehydes which can be substituted for butyraldehyde are crotonaldehyde and acetaldol. In the case of crotonaldehyde, the yield of the desired products are low since straight-chain aldehydes are formed for the most part. In order to use acetaldol, it is only necessary to employ acetaldehyde as a starting material and to continue the condensation beyond the point of making acetaldol, as in the following example.

Example II

Acetaldehyde in the liquid phase was subjected to condensation in the presence of a dilute caustic soda solution. With the temperature maintained below 20° C., the reaction was continued until acetaldol initially formed had further reacted with more acetaldehyde to produce polyaldols. The polyaldol mixture was separated out, and this portion then treated with dilute sulfuric acid at a temperature varying from 100° C. to 150° C. A resulting mixture was obtained of unsaturated aldehydes containing six or more carbon atoms, which was then subjected to hydrogenation in the presence of a nickel catalyst at a temperature of about 200° C. Distillation of this solution yielded about 50% of 2-ethylbutanol, other alcohols of higher carbon atom content, and various byproduct materials.

It will be understood that the examples given are merely illustrative of the invention, and modifications in the process, other than as indicated, may be evident to those skilled in the art. The invention should not be limited other than as defined in the appended claims.

I claim:

1. A process for making 2-ethylcrotonaldehyde for subsequent hydrogenation to 2-ethylbutyraldehyde, which comprises condensing a mixture of butyraldehyde and acetaldehyde in molar proportions respectively of at least 1:2 in the presence of a weak alkaline solution, and dehydrating the aldol mixture so formed by gradual addition to a boiling solution of not higher than 5% sulfuric acid.

2. A process for making 2-ethylcrotonaldehyde for subsequent hydrogenation to 2-ethylbutyraldehyde, which comprises condensing a mixture of butyraldehyde and acetaldehyde in molar proportions of about 1:4 in the presence of about a 2% aqueous solution of sodium hydroxide, and dehydrating the aldol mixture so formed by gradual addition thereof to a boiling solution of about 2% sulfuric acid.

3. A process for making 2-ethylcrotonaldehyde for subsequent hydrogenation to 2-ethylbutyraldehyde, which comprises condensing a mixture of butyraldehyde and acetaldehyde in molar proportions of about 1:4 in the presence of about a 2% aqueous solution of sodium hydroxide, and dehydrating the aldol mixture so formed by gradual addition thereof to a boiling solution of about 2% sulfuric acid while maintaining the acid concentration substantially constant.

HENRY L. COX.